United States Patent Office 3,378,596
Patented Apr. 16, 1968

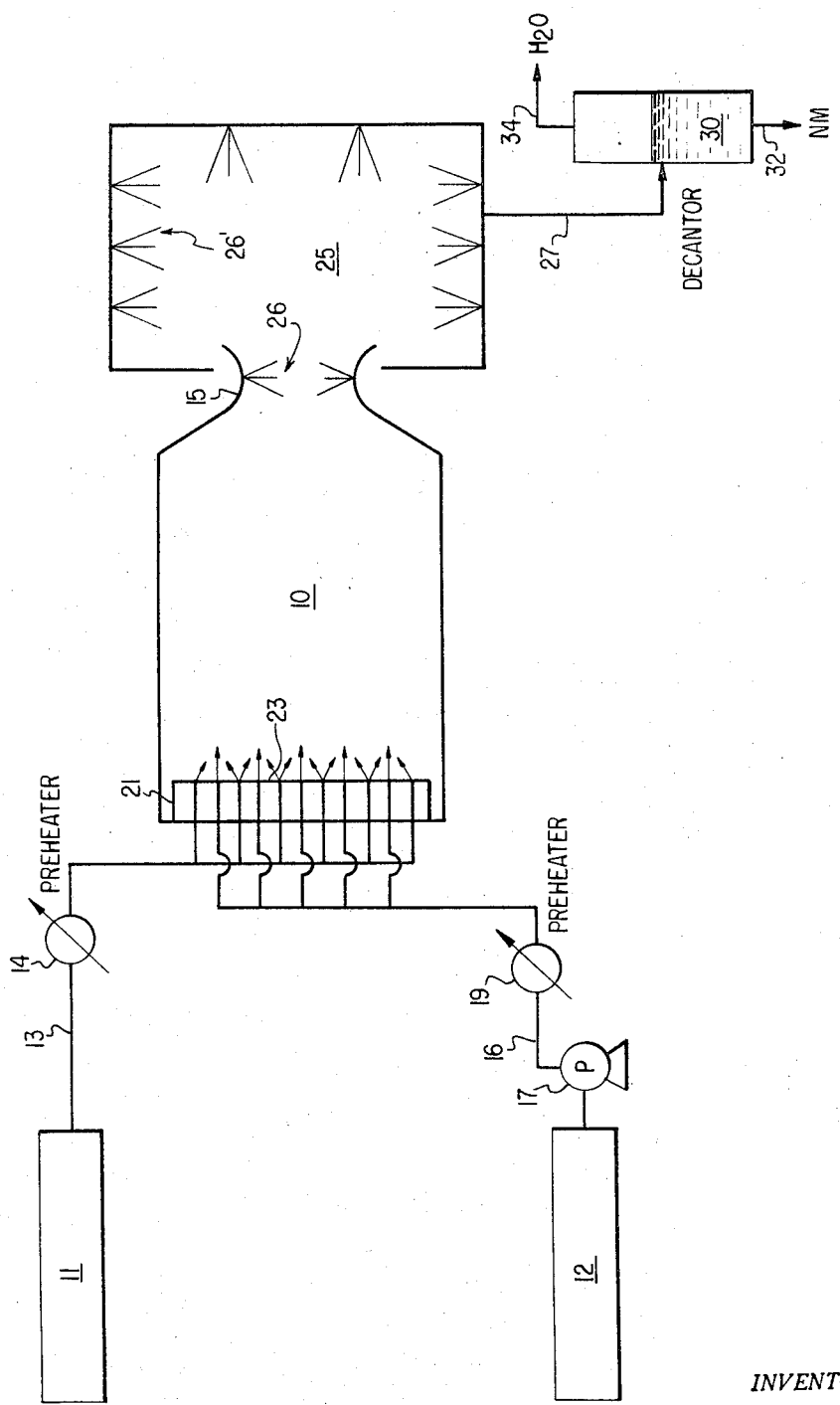

3,378,596
PROCESS FOR PRODUCING
NITROHYDROCARBONS
Emory E. Toops, Jr., Terre Haute, and Richard S. Egly, West Terre Haute, Ind., assignors to Commercial Solvents Corporation
Continuation-in-part of application Ser. No. 376,861, June 22, 1964. This application June 27, 1966, Ser. No. 560,437
23 Claims. (Cl. 260—644)

This application is a continuation-in-part of application Ser. No. 376,861, filed June 22, 1964, now abandoned.

The present invention relates to an improved process for short contact time reactions effected at elevated temperatures, and particularly to high-temperature reactions of an exothermic nature in which control of the reaction time and heat liberation are required. More particularly, the present invention relates to the preparation of lower nitro-alkanes by the vapor phase nitration of alkane to form nitro-alkane.

It is known that alkane, e.g., methane, can be nitrated with nitric acid in the vapor phase at temperatures between about 400 and 600° C. to produce nitromethane in yields ranging from about 5% to 20% based on nitric acid. The present invention relates specifically to certain improvements whereby the nitration may be accomplished with the production of maximum yields of nitromethane, a minimum of by-products and with greater economy in terms of equipment capacity. The process of the present invention comprises forming a mixture of methane, preferably preheated, and nitric acid, flowing the gaseous mixture through a reactor, especially a rocket or jet engine, at high velocity and pressure and then rapidly terminating the heating and consequently the reaction, when the optimum conversion has taken place by quenching the products of the reaction. Quenching can be accomplished, for example, through a sudden reduction of the pressure on the reactants, i.e., by expansion of the gaseous products of the reaction. Although the invention contemplates the use of both rocket and jet engines, the rocket engine is preferred for its simplicity and low cost.

The successful vapor phase nitration of methane was first described in U.S. Patents Nos. 2,161,475 and 2,164,774, issued to G. K. Landon. Both of these patents described the nitration of methane with nitric acid by passing the vaporized reactants through open tubular reactors which were externally heated to maintain a reaction temperature of about 375–550° F. for a contact time ranging between about 0.005 and 1 second.

The use of an externally heated tubular reactor is, however, disadvantageous from the standpoint of efficient heat transfer. A considerable length of the reactor is necessarily devoted to preheating the gas to reaction temperature. Also, when the reaction temperature is raised, the exothermic reaction causes a further temperature rise which is difficult to control, especially with externally heated reactors. Moreover, it is difficult to correlate temperature and contact time in such a manner as to maintain optimum relationship between those variables. It will be understood that if the temperature exceeds the optimum range, undesirable side reactions will proceed at a relatively faster rate than that at the optimum temperature. If the temperature falls short of the optimum range, the desired reaction may cease.

One of the more successful recent attempts at the nitration of methane involved the passage of a mixture of nitric acid and a large excess of methane in the gaseous phase and at an average pressure of 100 p.s.i.g. through a glass tube 3 millimeters in diameter and 180 feet long immersed in a salt bath at a temperature of 410–430° C. The reaction time was about 1.0 second and the nitromethane yields amounted to approximately 20%, based upon the nitric acid fed to the system. The exceedingly small diameter and great length of reaction tube was required to supply sufficient heat transfer per area per reaction space volume to maintain approximately isothermal conditions during the reaction. The required contact time of 0.1 to 1.0 second necessarily requires an exceedingly high gas velocity and therefore unduly high differential pressure across the small reactor tubes. The use of such small tubular reactors of great length is disadvantageous because of the large pressure drop through the reactor. Great difficulty is also often encountered through the blocking and breakage of such reactors.

It is the principal object of the present invention to provide a process for the nitration of alkanes at relatively high temperatures and for relatively short reaction times and to avoid the disadvantageous characteristics of small diameter tubes. A further object is to provide a means for rapidly quenching the reaction products to immediately terminate the reaction. Other objects and advantages will be apparent to those skilled in the art from the description which follows.

While the invention is described in detail with reference to the nitration of methane, the process of the invention is not so limited. If a higher nitrohydrocarbon is desired, the corresponding higher hydrocarbon, e.g., ethane, propane, decane, cyclohexane, benzene and the like may be employed in place of methane. Any vaporizable hydrocarbon containing from about 1 to 10 carbon atoms can be employed including alkanes, cycloalkanes and mono-ring aromatic although alkanes are the preferred reactant, especially lower alkanes with from 1 to 6 carbon atoms. Although the present invention has been and will be hereinafter described with reference to the nitration of hydrocarbons, it will be obvious to those versed in the art that it is equally applicable to other reactions involving high temperatures and short reaction times. Among such reactions are included the air oxidation of hydrocarbons to produce alcohols. Moreover, solid catalytic materials for particular reactions can be used in the reaction chamber.

The methane employed in the invention may be from any suitable source, either pure or impure, e.g., natural gases which contain, for example, between about 1% and 20% by volume of other gases such as ethane, propane, hydrogen and the like. If it is desired to produce only nitromethane, and if the natural gas contains appreciable quantities of ethane or propane, it is desirable to remove those latter constituents inasmuch as they are selectively attacked by the nitric acid.

Nitric acid of substantially any concentration, generally ranging from 50 to 100 percent, can be used in the invention. Fuming nitric acid or nitrogen tetroxide may also be employed. Generally, a molar excess of methane, e.g., 5 to 40, or more, moles of methane per mole of nitric acid, is employed in the reaction. Methane is advantageously employed in a molar excess to avoid the formation of a flame and the consequent production of carbon oxides, water, nitrogen and other products of combustion. One of the surprising features of the instant invention, however, is that it is not necessary to employ the very large mole excesses of methane which have sometimes been employed in the past to act merely as a heat control medium and mole ratios of 8 to 12 or 15 moles of methane per mole of nitric acid can be used in the process of this invention.

In accordance with the preferred embodiment of this invention, a rocket engine can be conveniently used as the reactor for the process to provide many advantages over the known processes. Such engines provide a reaction chamber capable of withstanding the temperature, pressures, etc., of the reaction. Furthermore, the bipropellant injection system for the engine provides a ready means for atomization and mixing of the nitric acid and methane. The expansion nozzle appearing in the different types of engines provides a means whereby the reaction may be quenched rapidly through a sudden expansion of the reaction products.

It is not essential that the reactant gases be mixed with each other before being introduced into the reaction zone. The methane gas can be preheated and introduced through the injector of the rocket engine. Nitric acid is injected into the methane stream. Such injectors are designed to spray the liquid, i.e., *nitric* acid into the reaction zone and provide for rapid atomization of the nitric acid. Furthermore, the injectors may be so arranged that nitric acid will be injected, i.e., sprayed laterally into the flowing stream of methane in the reaction chamber so as to create a state of high turbulence in the chamber with concomitant uniform mixing of the methane and atomized nitric acid. It is referred to utilize several radially-disposed, diametrically opposed inlet injectors which inject a plurality of streams in nitric acid into the flowing stream of methane. In order to achieve the desired result, it is necessary to inject the nitric acid at a mass velocity great enough so that it will not be merely swept downstream by the flowing methane. Otherwise, there will be an axial zone of insufficiently mixed methane and nitric acid, part of which will pass through the reactor unchanged.

When using the injectors in this invention, nitration of the atomized hydrocarbon begins immediately and, because nitration is exothermic, the heat given off assists in evaporation of the acid. The simultaneous nitration reaction and evaporation can be used to control the reaction temperature since it is believed to result in isothermal conditions as observed in the reaction system of this invention. Vaporization of the acid in the reaction zone is complete generally within about 1 to 15 milliseconds and preferably within about 4 milliseconds. This time is small compared to the residence time in the reaction zone which is on the order of more than 6 to 8 times the vaporization time, and up to about 40 times. Since by merely mixing the reactants and vaporizing a temperature is obtained which is so low that nitration does not start, the operating temperatures used in the reaction zone or chamber are those sufficient to accomplish the desired nitration, generally above 300° C., and insufficient to decompose the desired nitrohydrocarbon, preferably from about 450° to 700° C., and are correlated with the residence time of the reactants in the reaction chamber. The nitration process can be conducted at substantially any desired pressure, e.g., up to about 800 p.s.i.g. or more. Best results are ordinarily obtained at pressures of from about 60 to 600 p.s.i.g.

The residence time is, as mentioned above, interrelated with operating temperature and with the mole ratio of hydrocarbon to nitric acid, however, in general, this time is sufficient to nitrate the hydrocarbon but insufficient to produce undesirable by-products and does not exceed several hundred, i.e., about 250 to 350 milliseconds and preferably is less than about 70 to 85, particularly about 50 milliseconds. The higher the mole ratio, for example, the shorter the desired contact time and, since the concentration of the acid affects the mole ratio, it must also be considered. Additionally, lower temperatures are employed for longer contact times and although nitration at high temperatures and short residence times is desirable, practical and economic considerations may dictate the use of lower temperatures and longer residence times. At 1060° F. (571° C.), 66% nitric acid and residence times of 50 to 85 milliseconds, for example, maximum nitric acid conversion occurs at a methane: acid mole ratio of 33:1; whereas, upon dropping the temperature to 950° F. (510° C.) and increasing the residence time to 250 to 350 milliseconds, optimum conversion occurs at a mole ratio of 12:1. At 1100° F. (593° C.) and a mole ratio of 33:1, 45 milliseconds is optimum.

The reaction of methane with nitric acid in the reaction chamber is terminated as soon as possible to avoid side reactions and the production of oxygenated products. As the temperature is raised in the nitration of methane, the residence time in the reactor must be decreased to avoid side reactions and the production of oxidation products. Many of the problems of the known processes may stem from having a high temperature with too long a residence time.

The reaction mixture is forced through the reaction chamber at a relatively fast rate and then immediately expanded. The equilibrium of the reaction products is frozen and the reaction immediately terminated. The exhaust nozzle of the rocket engine provides a rapid quenching of the reaction through a sudden expansion of the reaction products from the operating pressure of the reaction chamber to atmospheric pressure. This expansion is on the order of about 20 to 60 to 1, based on the area of the throat of the exhaust nozzle to the area of the end of the expansion cone. The expansion rapidly cools the product from reaction temperatures to temperatures at which reaction can no longer occur, e.g., temperatures below about 300° C. in a time depending upon the composition of the reaction products.

The reaction product is preferably quenched by first injecting water into the throat of the exhaust nozzle and then expanding the reaction product into an expansion zone. The quenching is typically accomplished in from about 1 to about 15 milliseconds. Quenching is caused by vaporization of the water and expansion of the reaction products. The expansion zone can also have water injected thereinto. The product gases may be withdrawn following quenching and separated through the various known procedures for recovering nitromethane. Unreacted methane and nitric acid may be recovered and recycled if desired.

The invention will be more fully understood by reference to the drawing showing the utilization of a rocket engine in the instant process.

In the instant process methane and nitric acid are stored in vessels 11 and 12. In starting the reaction, the methane is preheated to about 700° C. and is then passed into the reaction chamber 10 until the desired operating temperature in the chamber is obtained. Nitric acid is then introduced into the chamber to give a mole ratio of methane to nitric acid of approximately 10:1. The reaction then occurs in the chamber at a temperature of, for example, about 550° C., a pressure of about 150 p.s.i.g. and a residence time in the chamber of about 120 milliseconds.

The methane from vessel 11 is supplied under pressure to the reaction chamber 10 through line 13 and preheater 14 by way of injector 21. The nitric acid from vessel 12 is pumped by pump 17 in line 16 into chamber 10 by way of injector 21. The injector injects the methane and nitric acid through their respective orifices supplied as shown by lines 13 and 16, respectively. Upon emission from the orifices on front plate 23, the nitric acid is atomized and mixed with the methane as shown by the arrow indications. The reaction products are expanded from the combustion chamber 10 through exhaust nozzle 15 into chamber 25. Quenching of the reaction products to a temperature at which the reaction cannot occur is accomplished by water sprays 26 in the throat of nozzle 15 and by expansion of reaction products into chamber 25. This expansion is on the order of about 40 to 1. Chamber 25 can contain additional water sprays 26', if desired. The cooled reaction products including nitromethane and water are conducted from chamber 25 to decanter 30 by way of line 27. The nitromethane is recovered through line 32 and water is removed through line 34.

When unreacted nitric acid is present in the reaction product, it may be advantageous to neutralize the reaction product, e.g., with sodium carbonate, to a pH approaching 7 to avoid deleterious effects of the nitric acid on the desired nitromethane. Alternatively, the reaction product can be cooled to avoid such effects.

The nitric acid can, if desired, be heated in preheater 19; however, all the preheat is preferably supplied in the methane. An advantage of this is that the reactor can then operate under substantially isothermal conditions since, as discussed above, all of the nitric acid is not immediately vaporized. This approach to isothermal conditions provides better temperature control by simultaneous vaporization and reaction.

The acid injection system, at the short residence times, provides for complete acid vaporization within about four milliseconds or less. The reactor shows no signs of corrosion or erosion and elimination of an acid preheater also avoids the problem of corrosion.

The following examples serve to further illustrate the invention.

EXAMPLE I

Utilizing as feed streams in the above system natural gas (95% methane) and 66% conc. $HNO_3$ in a mole ratio of $CH_4:HNO_3$ of 35:1, conversion to nitromethane of 9.6% was obtained at a temperature of 571° C., residence time of about 45 milliseconds and pressure of 150 p.s.i.g. A conversion of 10% was obtained with a mole ratio of 11.6 to 1 at a temperature of 510° C., residence time of 225 milliseconds and 150 p.s.i.g. pressure.

EXAMPLES II–V

These examples are conducted according to essentially the same procedure used in Example I except decane, cyclohexane, pentane, and benzene are used, respectively, instead of methane.

EXAMPLES VI–VII

These examples are conducted according to essentially the same procedure used in Example I except 59% conc. $HNO_3$ and 70% conc. $HNO_3$ are used, respectively, instead of 66% conc. $HNO_3$.

It is claimed:

1. A process for producing nitrohydrocarbons which comprises contacting atomized nitric acid and a molar excess of a hydrocarbon containing from about 1 to 10 carbon atoms in the gaseous phase in a reaction zone under nitration conditions including superatmospheric pressure, a temperature of at least 300° C. and sufficient to nitrate the hydrocarbon but insufficient to decompose the nitrohydrocarbon, and a residence time sufficient to nitrate the hydrocarbon and up to about 350 milliseconds, and immediately quenching the resultant reaction products to freeze the equilibrium of the reaction.

2. The process of claim 1 wherein said residence time is below 85 milliseconds.

3. The process of claim 1 wherein said quenching step comprises expanding said reaction products.

4. The process of claim 2 wherein said reaction products are expanded from the reaction pressure to approximately atmospheric pressure.

5. The process of claim 1 wherein the quenching step comprises expanding said reaction products through an exhaust nozzle having water injection means in the throat thereof and cooling said reaction products with water in said throat of the exhaust nozzle.

6. The process of claim 5 wherein quenching is accomplished in from 1 to about 15 milliseconds.

7. The process of claim 6 wherein the expansion ratio is approximately 20 to 60:1.

8. The process of claim 5 wherein the reaction products are expanded into a water-cooled chamber, the expansion ratio being approximately 20 to 60:1.

9. The process of claim 1 wherein the hydrocarbon is a lower alkane.

10. The process of claim 1 wherein said process is carried out in a rocket engine having a reaction chamber, a fluid injection system for atomizing, mixing and injecting fluids into said chamber and an expansion nozzle forming an exit from said chamber, said nitric acid and hydrocarbon being atomized and mixed in said injection system, and said reaction products being quenched by expansion through said nozzle.

11. The process of claim 2 wherein said temperature is between about 450° and 700° C.

12. The process of claim 11 wherein said molar excess is about 5 to 40 moles of nitrohydrocarbon per mole of nitric acid.

13. The process of claim 12 wherein said nitric acid is vaporized within about four milliseconds after introduction into said zone.

14. The process of claim 13 wherein the concentration of said nitric acid is from about 50 to 100 percent.

15. A process for the nitration of methane which comprises contacting methane and nitric acid in gaseous phase under nitration conditions in a reaction zone including a temperature from about 450 to 700° C., a pressure from about 60 to 600 p.s.i.g. and a residence time sufficient to nitrate the methane and less than about 350 milliseconds, the nitric acid being injected into a stream of methane within the zone at an angle to the flow path of said methane and at a mass velocity sufficient to create a state of turbulence in the zone, said nitric acid being vaporized in less than about 15 milliseconds, and quenching the resultant reaction products to freeze the equilibrium of the reaction within about 15 milliseconds.

16. The process of claim 15 wherein said reaction products are expanded to approximately atmospheric pressure.

17. The process of claim 15 wherein the quenching step comprises expanding said reaction products through an exhaust nozzle having water injection means in the throat thereof and cooling said reaction products with water in said throat of the exhaust nozzle.

18. The process of claim 17 wherein from about 5 to 40 moles of methane are employed per mole of nitric acid.

19. The process of claim 17 wherein from 5 to 15 moles of methane are employed per mole of nitric acid.

20. The process of claim 18 wherein said residence time is less than 85 milliseconds.

21. A process for producing nitrohydrocarbons which comprises contacting nitric acid and a preheated hydrocarbon containing from about 1 to 10 carbon atoms in the gaseous phase in a reaction zone under nitration conditions including superatmospheric pressure, a temperature of 450° to 700° C., a mole ratio of hydrocarbon to nitric acid of 5 to 40:1 and a residence time sufficient to nitrate the hydrocarbon and up to about 50 milliseconds, and immediately quenching the resultant reaction products to freeze the equilibrium of the reaction.

22. The process of claim 21 wherein the hydrocarbon is methane.

23. The process of claim 21 wherein the hydrocarbon is a lower alkane.

References Cited

UNITED STATES PATENTS

| | | | |
|---|---|---|---|
| 3,133,123 | 5/1964 | Bonfield | 260—644 |
| 3,133,124 | 5/1964 | Bonfield | 260—644 |
| 3,173,961 | 3/1965 | Drimus et al. | 260—644 |

OTHER REFERENCES

Urbanski, Chemistry and Technology of Explosives, vol. 1, The MacMillan Company, New York, 1964, pp. 86 to 90 and 133 to 138. TP 270 U7.

CARL D. QUARFORTH, *Primary Examiner.*

L. A. SEBASTIAN, *Assistant Examiner.*